US012638571B2

(12) United States Patent
Hasson et al.

(10) Patent No.: US 12,638,571 B2
(45) Date of Patent: May 26, 2026

(54) DISTRIBUTED RADAR SYSTEM AND METHOD OF OPERATION THEREOF

(71) Applicant: ISRAEL AEROSPACE INDUSTRIES LTD., Lod (IL)

(72) Inventors: Joseph Hasson, Neve Monson (IL); Galya Goldner, Tel-Aviv (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 627 days.

(21) Appl. No.: 17/916,851

(22) PCT Filed: Mar. 21, 2021

(86) PCT No.: PCT/IL2021/050313
§ 371 (c)(1),
(2) Date: Oct. 4, 2022

(87) PCT Pub. No.: WO2021/205429
PCT Pub. Date: Oct. 14, 2021

(65) Prior Publication Data
US 2023/0144558 A1      May 11, 2023

(30) Foreign Application Priority Data

Apr. 5, 2020      (IL) ......................................... 273814

(51) Int. Cl.
*G01S 13/44*          (2006.01)
*G01S 13/00*          (2006.01)
(Continued)

(52) U.S. Cl.
CPC ........ *G01S 13/4418* (2013.01); *G01S 13/003* (2013.01); *G01S 13/4454* (2013.01);
(Continued)

(58) Field of Classification Search
CPC .............. G01S 13/4418; G01S 13/003; G01S 13/4454; G01S 13/4463; G01S 13/582;
(Continued)

(56) References Cited

U.S. PATENT DOCUMENTS 4,912,477 A * 3/1990 Lory ..................... G01S 13/426
342/372
5,017,929 A * 5/1991 Tsuda ................... G01S 7/2813
342/427
(Continued)

FOREIGN PATENT DOCUMENTS

EP     3552041 B1 *  6/2023  ............. G01S 13/89
JP     7022916 B2 *  2/2022  ............. G01S 13/42
(Continued)

OTHER PUBLICATIONS

Gogineni, S. , et al., "Target tracking using monopulse MIMO radar with distributed antennas", IEEE, May 2010, 194-199.
(Continued)

*Primary Examiner* — Nuzhat Pervin
(74) *Attorney, Agent, or Firm* — Ballard Spahr LLP

(57) ABSTRACT
Distributed radar systems and techniques for processing data received from such distributed radar systems. The distributed radar systems may utilize data on beam spatial pattern for processing collected signals and determining direction of one or more reflection origins (e.g., one or more objects reflecting transmitted signal).

16 Claims, 8 Drawing Sheets

(51) Int. Cl.
  *G01S 13/02* (2006.01)
  *G01S 13/58* (2006.01)
  *H01Q 3/36* (2006.01)
(52) U.S. Cl.
  CPC ........ *G01S 13/4463* (2013.01); *G01S 13/582*
    (2013.01); *H01Q 3/36* (2013.01); *G01S*
    *2013/0245* (2013.01)
(58) Field of Classification Search
  CPC . G01S 2013/0245; H01Q 3/36; H01Q 21/061
  USPC ........................................................ 342/113
  See application file for complete search history.

(56) References Cited

U.S. PATENT DOCUMENTS

| | | | | |
|---|---|---|---|---|
| 5,200,755 A | * | 4/1993 | Matsuda | H01Q 25/00 |
| | | | | 342/158 |
| 5,579,010 A | * | 11/1996 | Iihoshi | G01S 13/48 |
| | | | | 342/115 |
| 6,462,699 B2 | * | 10/2002 | Wurman | G01S 13/951 |
| | | | | 342/158 |
| 9,261,590 B1 | * | 2/2016 | Brown | G01S 13/93 |
| 9,269,255 B2 | * | 2/2016 | Beaulieu | B66C 15/045 |
| 9,500,741 B2 | * | 11/2016 | Kishigami | G01S 7/414 |
| 10,459,075 B2 | * | 10/2019 | Clark | H01Q 3/2617 |
| 10,649,075 B2 | * | 5/2020 | Schuman | G01S 7/414 |
| 10,823,819 B2 | * | 11/2020 | Loesch | G01S 13/42 |
| 10,871,551 B2 | * | 12/2020 | Fluhler | G01S 7/2922 |
| 11,009,598 B2 | * | 5/2021 | Dobrev | G01S 13/87 |
| 11,199,619 B2 | * | 12/2021 | Kishigami | G01S 13/42 |
| 11,422,249 B2 | * | 8/2022 | Roger | G01S 13/584 |
| 11,520,030 B2 | * | 12/2022 | Wu | G01S 7/288 |
| 2001/0013839 A1 | * | 8/2001 | Wurman | G01S 13/951 |
| | | | | 342/26 R |
| 2002/0014985 A1 | * | 2/2002 | Wurman | G01S 13/003 |
| | | | | 342/26 R |
| 2003/0164791 A1 | * | 9/2003 | Shinoda | H01Q 3/2605 |
| | | | | 342/149 |
| 2007/0262897 A1 | * | 11/2007 | De Mersseman | G01S 13/42 |
| | | | | 342/70 |
| 2016/0131753 A1 | * | 5/2016 | Brown | G01S 13/931 |
| | | | | 342/128 |
| 2018/0060725 A1 | * | 3/2018 | Groh | G06N 3/09 |
| 2019/0018128 A1 | * | 1/2019 | Shollenberger | G01S 13/003 |
| 2019/0317207 A1 | * | 10/2019 | Schroder | G01S 13/325 |
| 2020/0064455 A1 | * | 2/2020 | Schroder | G01S 13/325 |
| 2020/0064462 A1 | * | 2/2020 | Hong | G01S 13/72 |
| 2020/0198674 A1 | * | 6/2020 | Arieli | G01S 7/354 |
| 2020/0209380 A1 | * | 7/2020 | Takayama | G01S 7/352 |
| 2020/0386878 A1 | * | 12/2020 | Bialer | G01S 13/931 |
| 2021/0263139 A1 | * | 8/2021 | Ray | G01S 13/87 |

FOREIGN PATENT DOCUMENTS

| | | | | |
|---|---|---|---|---|
| WO | WO-2007033967 A1 | * | 3/2007 | ........ G01S 13/4454 |
| WO | WO-2007091929 A1 | * | 8/2007 | .......... G01S 13/878 |

OTHER PUBLICATIONS

Spong, R. N., "An efficient method for computing azimuth and elevation angle estimates from monopulse ration measurements of a phased array pencil beam radar with two-dimensional angle steering", 1999.

* cited by examiner

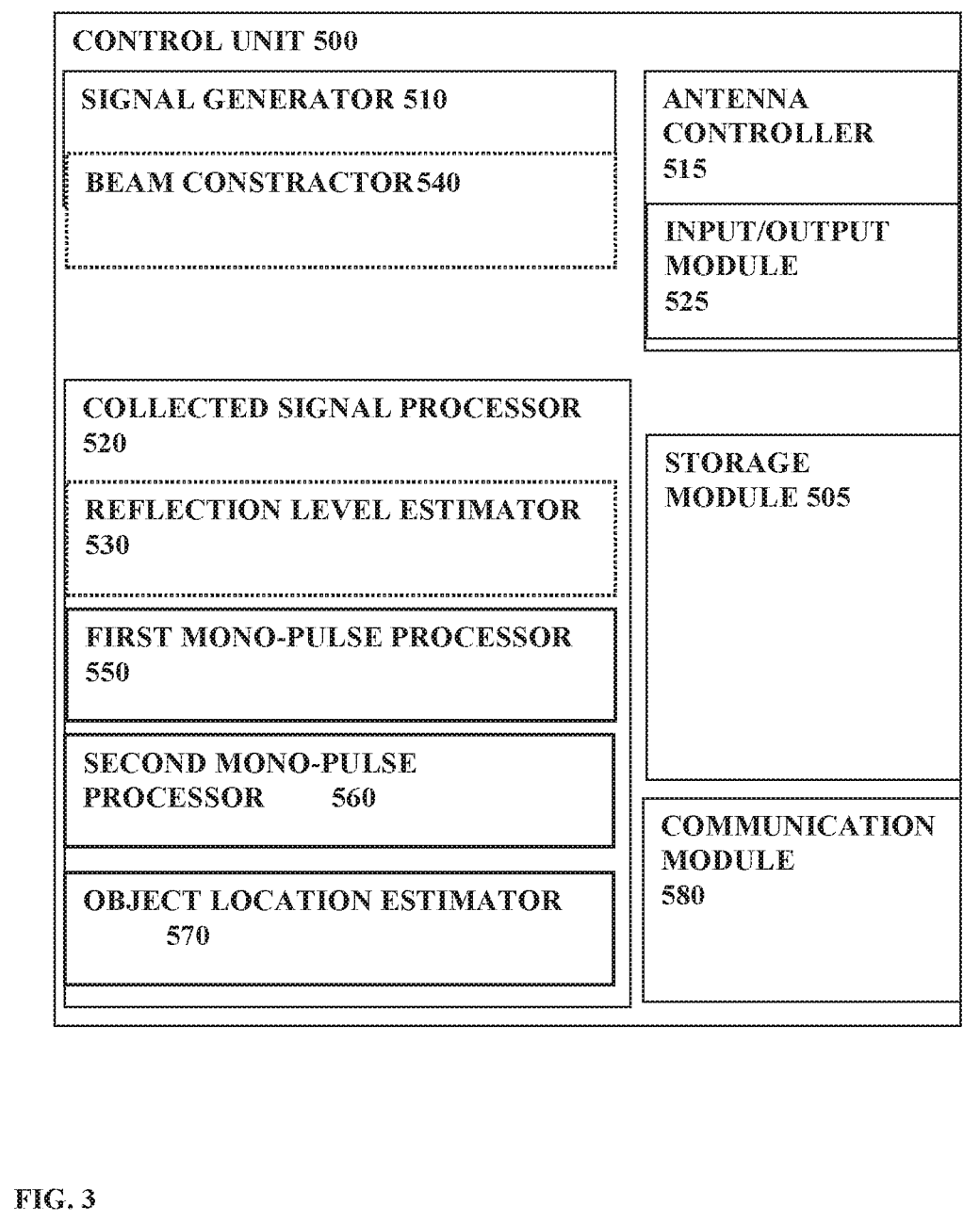

CONTROL UNIT 500

SIGNAL GENERATOR 510

BEAM CONSTRACTOR 540

ANTENNA CONTROLLER 515

INPUT/OUTPUT MODULE 525

COLLECTED SIGNAL PROCESSOR 520

REFLECTION LEVEL ESTIMATOR 530

FIRST MONO-PULSE PROCESSOR 550

SECOND MONO-PULSE PROCESSOR 560

OBJECT LOCATION ESTIMATOR 570

STORAGE MODULE 505

COMMUNICATION MODULE 580

FIG. 3

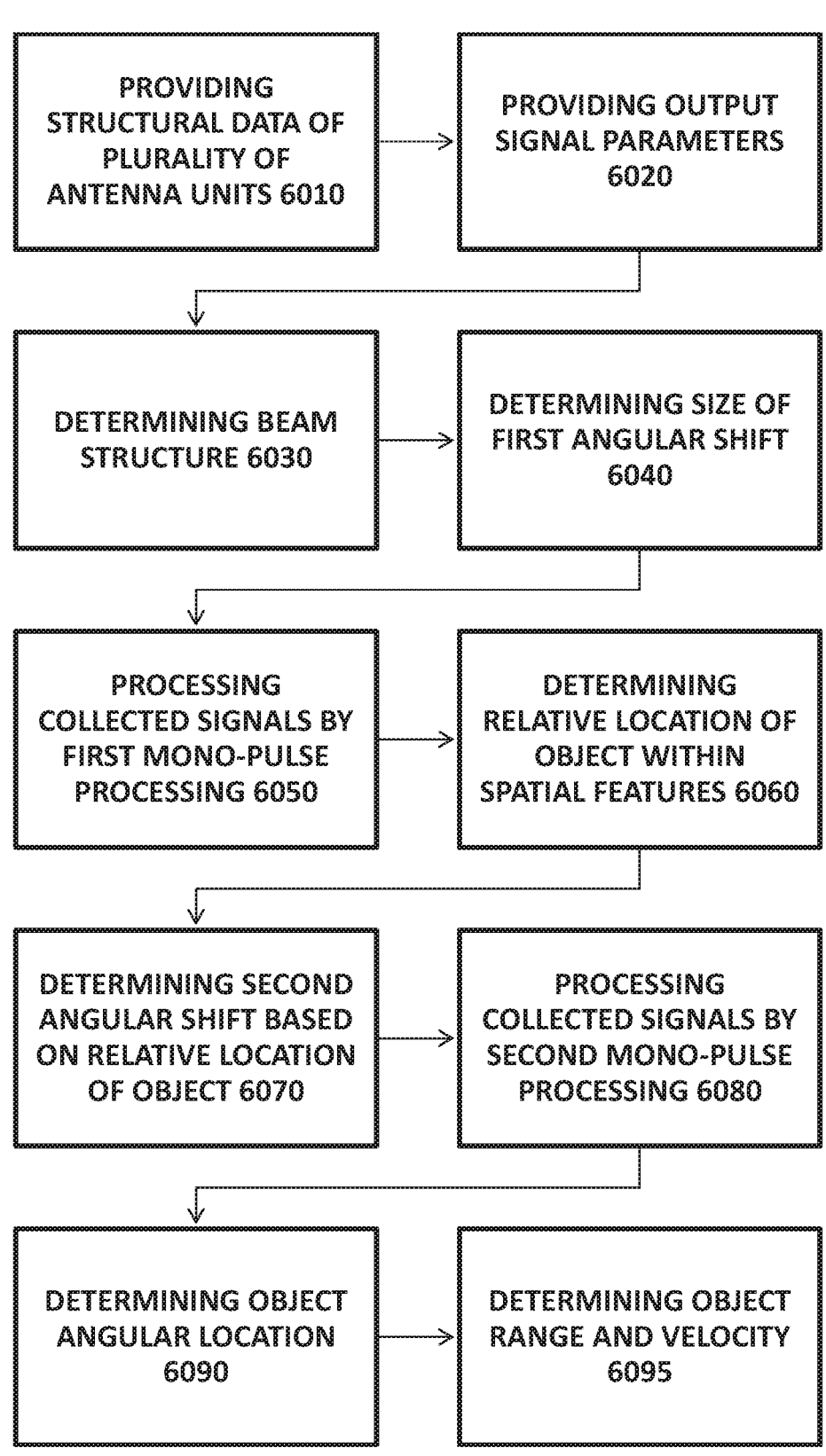

PROVIDING STRUCTURAL DATA OF PLURALITY OF ANTENNA UNITS 6010

PROVIDING OUTPUT SIGNAL PARAMETERS 6020

DETERMINING BEAM STRUCTURE 6030

DETERMINING SIZE OF FIRST ANGULAR SHIFT 6040

PROCESSING COLLECTED SIGNALS BY FIRST MONO-PULSE PROCESSING 6050

DETERMINING RELATIVE LOCATION OF OBJECT WITHIN SPATIAL FEATURES 6060

DETERMINING SECOND ANGULAR SHIFT BASED ON RELATIVE LOCATION OF OBJECT 6070

PROCESSING COLLECTED SIGNALS BY SECOND MONO-PULSE PROCESSING 6080

DETERMINING OBJECT ANGULAR LOCATION 6090

DETERMINING OBJECT RANGE AND VELOCITY 6095

FIG. 6

DISTRIBUTED RADAR SYSTEM AND METHOD OF OPERATION THEREOF

TECHNOLOGICAL FIELD

The present invention relates to distributed radar systems and techniques for processing data received from such distributed radar systems.

BACKGROUND

Distributed radar systems utilize collective signal transmission and collection by an arrangement of synchronized antenna units. Generally, such distributed radar systems (DRS) are formed by a plurality of antenna units arranged in a predetermined array in a selected region. The plurality of antenna units is typically operated together for transmitting an interrogating electromagnetic signal, using phase relation between the antenna units for stirring the transmitted and received signals. Further, the plurality of antenna units is operated for collectively receiving reflected signals and utilize data of phase and time variations in receiving collected signals between the plurality of antenna units, for determining location of reflecting object.

Distributed radar systems may typically provide robust and high accuracy detection. The distributed arrangement of antenna units provides an effective large aperture, enabling high resolution in object detection. Additionally, distributed radar systems have increased survivability, as inoperative state of one or more antenna units may introduce noise and reduce accuracy but might not prevent the radar system from operating.

GENERAL DESCRIPTION

As indicated above, distributed radar systems can provide robust high accuracy detection of objects. Such distributed radar system may generally be formed by an array of synchronized antenna units arranged in a selected array and configured to collectively transmit (and possibly receive) outgoing signals. Transmission pattern of a distributed radar system may typically be formed by a main envelope beam, carrying a plurality of spatial features (e.g. teeth) within the envelope. This transmission pattern may often render the use of distributed radar systems as highly complex. This may cause ambiguity in determining direction of objects that should be identified by the radar system. Thus, the beam pattern of distributed radar system generally limits the convention interrogation ability as the location data is non-specific. It should be noted that typically, distance of the object from the radar system, and closing velocity of the objects may be determined using time delay and Doppler shift of the reflected signal. Additionally, receive beams determined from signals collected by such distributed radar system, also carries a plurality of spatial features forming teeth within the beam envelope, causing ambiguity in locating origin of collected reflections.

Thus, there is a need in the art for a novel approach in obtaining accurate, unambiguous and reproducible location data when operating with distributed radar systems. To this end, the present invention provides for a novel approach in processing radiation signals collected by such distributed radar system, for determining direction of one or more object in accordance with the collected signals.

More specifically, the present technique utilizes data on beam spatial pattern for processing collected signals and determining direction of one or more reflection origins (e.g.

one or more objects reflecting transmitted signal). The beam spatial pattern generally includes envelope angular width and width and periodicity of spatial features (teeth) within the main envelope of signal transmitted by the distributed radar system. The reflected signals are generally collected by one or more collection antennas that may be the same distributed array of antenna units or by one or more other antenna units. The processing is generally based on the general concept of mono-pulse detection, while considering the internal structure forming teeth within the signal envelope. For example, the processing generally comprises determining, within collected signal data, receive beams having selected angular shifts with respect to a selected axis (e.g. boresight of the radar system or an approximate line of sight from radar to the target), and determining relation or difference between the reflected signals obtained by the receive beams. In order to determine accurate directions of objects, considering the teeth structure of the received beam, the present technique utilizes at least first and second mono-pulse processing stages, where at least one mono-pulse processing stage related to width of transmitted signal envelope, and at least one another mono-pulse processing stage related to angular width of the spatial features (teeth) within the transmitted signal envelope.

As generally indicated above, each mono-pulse processing stage utilizes determining first and second receive beams, from data collected by a plurality of antenna units. The collection antenna units may be the same antenna units used for transmitting electromagnetic interrogating signal, a portion of the plurality of transmitting antenna units or a separated arrangement of antenna units.

Thus, the collecting one or more antenna units generate output data indicative of electromagnetic signals collected over selected time (generally following transmission of an interrogating signal). Using the output data, the technique determined two receive beams for at least one axis, and typically along two intersecting axes. The receive beams are generally determined by coherent summing/integration of the output data with corresponding phase relations. A relation between the signal strength (amplitude, intensity, phase) in the two receive beams provides data indicative of relative direction of one or more objects (being the origin of the reflected signal, or reflection origin as used herein below) with respect to directions of the receive beams.

As indicated above, the present technique utilizes at least first and second mono-pulse processing stages, differing between them in the angular shift between the receive beams used. More specifically, one angular shift is within the order of angular width of envelope of the transmitted signal as typically used on the conventional mono-pulse processing techniques. While another angular shift is determined to be within the order of angular width of the teeth (spatial features) within the beam envelope. Generally, using the large (envelope wide) angular shift enable determining location of the reflection origin with respect to directions of the receive beams. However, the inventors of the present technique have discovered that this processing is insufficient in the case of distributed antenna array. The internal structure of signal transmitted from such distributed antenna array includes a plurality of teeth, and of received beams determined from signals collected by a distributed antenna array, causing ambiguity in accurate direction based on angular width of the teeth.

In some configurations of the technique, a first mono-pulse processing is operated on the collected data, using first angular shift being within the order of angular width of the teeth within the receive beam. This first mono-pulse processing stage enabled to determine relative location of the reflection signal origin within angular span of the teeth in the received signal, but not which tooth in the receive envelope. The second mono-pulse processing stage utilizes angular shift of the order of angular width of the beam envelope, enabling to determine the direction of the reflected signal origin relative to direction of the determined receive beams.

It should be noted that the above described technique is generally suitable for determining location of one or more objects reflecting the transmitted signals within a two-dimensional plane. More specifically, time delay between the transmitted signal and collection of the reflected signal is indicative of distance between the antenna units and the objects, and angular location of the object determined as indicated above provides transverse location within a plane including the received beams used. In some configurations, determining of object location within a three-dimensional space is desired. To this end, the above described technique may be operated along two orthogonal axes, i.e. first and second mono-pulse processing stages along vertical axis and first and second mono-pulse processing stages along horizontal axis.

Thus, according to a broad aspect, the present invention provides an antenna system comprising:

a plurality of antenna units arranged in a predetermined spaced apart arrangement in a selected region and configured to collectively transmit output radiation signal having known transmitted beam features;

a control system connected to the plurality of antenna units and configured for:

transmitting operational instructions to said plurality of antenna units for transmitting radiation signals;

receiving data indicative of collected radiation signals, collected in response to reflection of the transmitted signal, and processing the data indicative of the collected radiation signals and determining at least data on angular location of one or more objects associated with said collected radiation signals;

wherein, said processing comprising, for at least one axis:

applying a first mono-pulse beam processing characterized by a first angular shift, and determining relative location of said one or more objects with respect to internal features in the received beam, and applying a second mono-pulse beam processing characterized by a second angular shift for determining location of said one or more objects with respect to said arrangement of plurality of antenna units.

According to some embodiments, the plurality of antenna units may be operated for transmitting said output radiation signal, and for receiving electromagnetic signals associated with reflection of said output radiation signal.

According to some embodiments, the antenna system may further comprise a receiving antenna arrangement comprises a plurality of antenna units adapted for collecting electromagnetic signals associated with reflection of said output radiation signal.

According to some embodiments, the plurality of antenna units comprises one or more phase array antenna units. The plurality of antenna units may all be configured as phase array antenna units.

According to some embodiments, the second angular shift is determined based of angular width of envelope of said output radiation signal, being an integer multiple of angular distance between internal features in said received signal beam.

According to some embodiments, the second angular shift is further determined in accordance with said relative location of said one or more objects.

According to some embodiments, the first angular shift is determined in accordance with angular width of internal features in said beam, and wherein said first angular shift is smaller with respect to said second angular shift.

According to some embodiments, the plurality of antenna units may be arranged facing substantially parallel direction.

According to some embodiments, the plurality of antenna units may be arranged in conformity with certain environment pattern, phase and time delay of signal components adjusted between the plurality of antenna units for transmitting desired output radiation signal.

According to some embodiments, the plurality of antenna units may be arranged in predetermined locations.

According to some embodiments, the plurality of antenna units may be configured for synchronous transmission of the output radiation signal.

According to some embodiments, the plurality of antenna units comprise antenna units mounts on one or more moveable platforms. For example, the antenna units may be mounted on one or more airplanes, satellites, and/or ships, while being collectively and synchronously operated together.

According to some embodiments, the processing comprises:

applying a first mono-pulse beam processing characterized by a first angular shift along first selected axis, and determining relative location of said one or more objects with respect to selected received beam features;

applying a second mono-pulse beam processing characterized by a second angular shift along said first selected axis and determining location of said one or more objects with envelope structure of received beam along said first selected axis;

repeating said first and second mono-pulse processing utilizing corresponding first and second angular shifts along a second axis, being non-parallel with said first axis, and determining location of said one or more objects with envelope structure of received beam along the second selected axis.

According to some embodiments, the processing further comprises determining distance of said one or more objects in accordance with time delay between time of transmission of signal and time of collecting of collected radiation signals portions.

According to some embodiments, the processing further comprises determining closing velocity of said one or more objects in accordance with doppler shift of collected radiation signals.

According to some embodiments, each of said first and second mono-pulse processing comprise determining first and second receive beams shifted between them by a selected angular shift, and determining a predetermined relation between said first and second receive beams, said predetermined relation being indicative of angular location of said one or more objects within span of said angular shift.

According to some embodiments, the predetermined relation is determined as absolute value of difference between complex values of the first and second receive beams, normalized by absolute value of sum of the first and second receive beams and utilizing sign of difference between absolute values of the first and second receive beams.

According to one other abroad aspect, the present invention provides a control unit for use in distributed radar system, the control unit comprises:

communication module configured for communicating with a plurality of antenna units for receiving input data indicative of collected radiation signal portions from said plurality of antenna units, said radiation signal portions being associated with reflected signal portions from one or more objects;

at least one processor, said processor comprises a localization module adapted for processing said input data and determining location of one of more objects;

said processing comprises for at least one axis: applying a first mono-pulse beam processing characterized by a first angular shift, and determining relative location of said one or more objects with respect to selected features of beam received (or transmitted) by said plurality of antenna units, and applying a second mono-pulse beam processing characterized by a second angular shift for determining angular location of said one or more objects with respect to said arrangement of plurality of antenna units.

According to some embodiments, the control unit comprises storage utility and at least one processor, said storage utility comprises array location data indicative of locations of said plurality of antenna units, said at least one processor comprises beam constructor adapted for using data of location of said plurality of antenna units and data on beam transmitted or received by said plurality of antenna units for determining beam features data indicative of toothlike features in the beam structure.

According to yet another broad aspect, the present inventions provides a method for use in operation of distributed radar (detection, tacking and/or measurement), the method comprising:

providing data of spatial arrangement of a plurality of antenna units and signal transmitted therefrom and determining one or more features of transmitted beam;

providing input data collected from a plurality of antenna units and indicative on collected electromagnetic radiation signals associated with reflection of said signal from one or more objects;

processing the input data for determining location of said one or more objects with respect to said arrangement of a plurality of antenna units, said processing comprises:

applying a first mono-pulse beam processing characterized by a first angular shift, and determining relative location of said one or more objects with respect to said one or more features of a received beam, and applying a second mono-pulse beam processing characterized by a second angular shift for determining location of said one or more objects with respect to said arrangement of plurality of antenna units.

In some configurations, the features of transmitted beam are spatially associated with features in structure of received beams, typically determined based on data collected by the antenna units.

According to some embodiments, the processing comprises applying said first and second mono-pulse processing along a first selected axis and applying said first and second mono-pulse processing along a second selected axis, intersecting with said first selected axis.

According to some embodiments, the second angular shift is determined in accordance with said relative location of said one or more objects.

According to some embodiments, the first angular shift is smaller with respect to said second angular shift.

According to some embodiments, the first angular shift is determined in accordance with angular distribution of one or more features of received beam being in the form of lobes/ teeth in spatial structure of beam transmitted or received by the plurality of antenna units collectively.

According to some embodiments, the second angular shift is determined in accordance with angular width of envelope of spatial structure of beam transmitted or received by the plurality of antenna units collectively.

According to some embodiments, applying mono-pulse processing comprises, determining first and second summations of input data pieces, associated with signal portions received by each of said plurality of antenna units using first and second selected time and/or phase variations between said antenna units, wherein said time and/or phase variations being indicative of a corresponding angular shift between said first and second summations, and determining difference between said first and second summations, to thereby determine angular location of one or more objects associated with the collected reflection signal.

According yet further a broad aspect, the present invention provides a software product embedded in a computer readable medium and comprising computer instructions that when executed by one or more computer processor cause the processor to:

providing data of spatial arrangement of a plurality of antenna units and signal transmitted therefrom and determining one or more features of beam formed by the arrangement of antenna units;

providing input data collected from a plurality of antenna units and indicative on collected electromagnetic radiation signals associated with reflection of said signal from one or more objects;

processing the input data for determining location of said one or more objects with respect to said arrangement of a plurality of antenna units, said processing comprises:

applying a first mono-pulse beam processing characterized by a first angular shift, and determining relative location of said one or more objects with respect to said one or more features of the received beam, and applying a second mono-pulse beam processing characterized by a second angular shift for determining location of said one or more objects with respect to said arrangement of plurality of antenna units.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3 exemplifies configuration of a control unit for use in distributed antenna system according to some embodiments of the invention;

FIG. 6 exemplifies operation of the present technique according to some additional embodiments of the present invention.

DETAILED DESCRIPTION OF EMBODIMENTS

Figure 1:
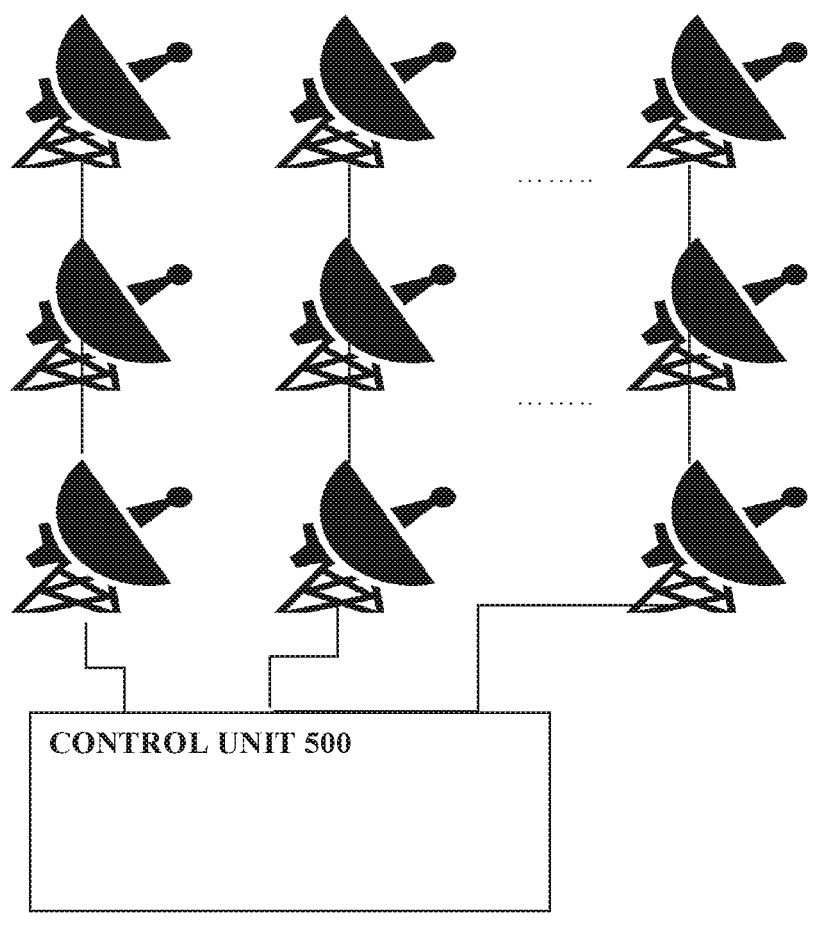
FIG. 1 illustrates a distributed antenna system according to some embodiments of the present invention.

As indicated above, the present invention provides a distributed radar system and a technique for detecting location of one or more objects in accordance with reflected signals collected by such distributed radar system. Reference is made to FIG. 1 exemplifying a distributed radar system 100. The radar system 100 is formed by a plurality of antenna units, generally at 50, arranged in a selected array (e.g. two-dimensional array) within a region/field. The antenna units are connected to control unit 500 configured and operable for providing instructions to the antenna units for transmission of signal to provide output radiation, and for receiving and processing reflected signals collected by the antenna units 50. The antenna units 50 are arranged in a predetermined array, e.g. having periodic or almost periodic arrangement. Antenna units 50a to 50n exemplify one row of the arrangement.

As exemplified in FIG. 1, the antenna units 50 may be any type of antenna units. In some configurations, es exemplified in FIG. 1, the antenna units 50 may include directional elements such as radiation reflecting dish. Alternatively, the antenna units 50 may be include formed radiation elements non-isotropic transmission pattern and/or configured to be selectively rotatable. In some additional examples, as exemplified in FIG. 2, the antenna units 50 may be phased array antenna units. Typically, the antenna units 50 may include circuitry for receiving transmission instructions from the control unit, generate the selected signal and transmit the signal with selected transmission properties such as direction, time delay and phase. To this end the antenna unit may be equipped with clock modules, associated with the corresponding circuitry, tuned to provide high-accuracy synchronization in signal transmission. This is to enable the plurality of spaced-apart antenna units to collectively transmit selected beam patterns having defined envelope, transmission time and direction of propagation. Additionally, the circuitry of each of the antenna units may include an input port, signal modulator, direction module and signal amplifier.

Figure 2:
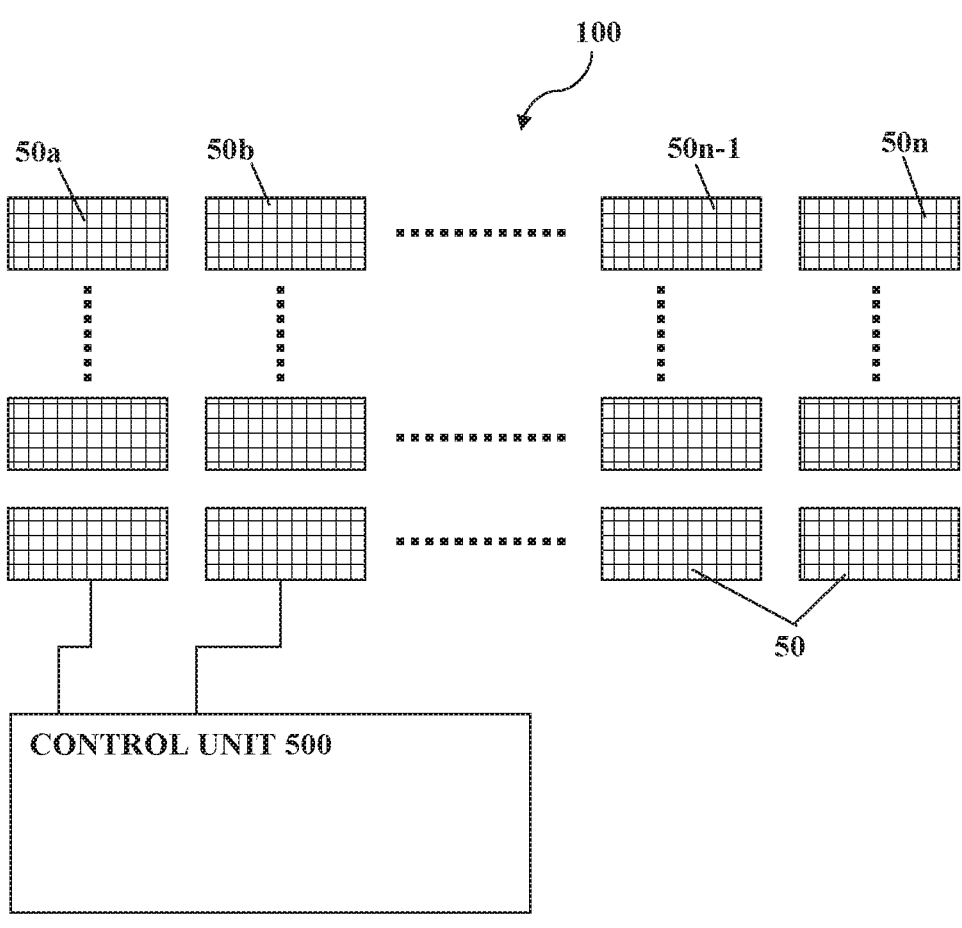
FIG. 2 illustrates a distributed antenna system utilizing phase array antenna units according to some embodiments of the invention.

As indicated, FIG. 2 exemplifies distributed radar system 100 utilizing a plurality of phased array antenna units 50. Such phase array antenna units are formed of an array of radiating elements, each associated with phase shifter, configured for transmitting selected signals. Each of the radiating elements transmits a signal with selected time and/or phase shift such that the phased array antenna unit 50 transmits the selected signal toward a selected direction. further, as indicated above, the antenna units 50 may include signal transmission circuitry, signal amplifier and modulator configured for receiving signal transmission instructions for the control unit 500 and determining the signal and time/phase shifts for transmission, and for receiving collected signal and transmitting the collected signals back to the control unit 500. To this end, phase array antenna units 50 generally include phase shifters associated with the radiating elements to provide desired beam stirring of the transmitted signal.

The radar system exemplified in FIGS. 1 and 2 may operate the plurality of antenna units 50, some of the antenna units 50 or separate antenna units for collecting electromagnetic signals being reflected from one or more objects. Generally, the receiving antennas utilize an arrangement of antenna elements providing a selected plurality of receive channels. Each receive channel is a stream of received electromagnetic radiation along a selected time. Thus, the plurality of receive channels include for each channel data indicative of time of reception of signal portions with respect to transmission of the corresponding signal, and data about location of the receiving antenna element. For simplicity, in the description herein below, the present invention is described using common antenna units (antenna units 50) for transmission and reception. However as described herein, the receiving antenna arrangement may be different, and may be differently located.

The control unit 500 is configured for generating and transmitting operation instructions to the plurality of antenna units 50 to transmit an output signal, and for receiving from collecting antenna units (being the same plurality of antenna unit 50 or additional antenna units) collected data indicative of electromagnetic radiation collected within a selected time following transmission time of the output/interrogating signal. The control unit 500 may further be configured for processing the collected data for identifying one or more possible objects that cause reflection of the output/interrogating signal. To this end, the control unit utilizes, for at least one axis of detection, first and second mono-pulse processing stages having corresponding first and second different angular shifts. The first and second angular shifts are determined in accordance with data on envelope width and width of spatial features within beam structure of signal transmitted (or received) by the plurality of antenna units 50. Generally, as indicated above, the control unit may operate for processing the collected data along two substantially orthogonal axes being perpendicular to boresight of the arrangement of antenna units 50, e.g. horizontal and vertical axes, to thereby determine three-dimensional location of one or more objects being the origin of reflected signals.

Reference is made to FIG. 3, exemplifying a control unit 500 according to some embodiments of the present technique. The control unit 500 is exemplified herein as suitable for operating the distributed radar system 100 of FIG. 1 or 2 entirely, i.e. operated for transmission of interrogating signal and for processing of the collected signals. However, it should be noted that the such distributed radar system may operate to transmit the collected signals (or selected portions of the collected signals) to be processed in a remote processing system as described herein below.

The control unit 500, as exemplified in FIG. 3, includes a signal generator 510, antenna controller 515, collected signal processor 520, storage module 505 and communication module 580. The signal generator 510 is adapted for selecting and generating signal to be transmitted by the plurality of antenna units 50, and direction of transmission. The signal generator may include a beam constructor 540, configured for determining spatial structure of transmitted/receive beam. The spatial structure of transmitted beam is determined based on arrangement of the antenna units 50, and parameters of the signal to be transmitted. The antenna controller 515 generally includes input/output module 525 for communicating with the plurality of antenna units 50, transmitting interrogating signal to be sent and selected direction for transmission. Additionally, the antenna controller 515 or its input/output module 525 may be configured for receiving collected signals for antenna units operated for collecting reflected signals. As indicated above, these may be the same plurality of antenna unit 50, or a set of separated antenna units.

The collected signal processor 520 is adapted for receiving data on signals collected in response to transmission of an interrogating signal, and for processing the data to determine location of one or more objects in path of the transmitted interrogating signal. Generally, the collected data may be in the form of a plurality of collection channels, each indicating of electromagnetic radiation in selected frequency range, collected by an antenna element of the collection antenna arrangement, generally of antenna units 50, or additional collection antenna arrangement. The collected signal processor 520 includes first 550 and second 560 mono-pulse processors and object location estimator 570 and may also include reflection level estimator 530.

Typically, interrogating signals may be transmitted, while in case there are no meaningful objects in the path of the signal, the collected reflection signals may be very weak. To this end, the reflection level estimator 530 may estimate general level of collected signal to identify if there is at least some object causing reflection of the interrogating signal. If the level (e.g. integrated amplitude) of reflected signal collected exceeds a selected threshold, indicating that one or more objects may exist in path of the interrogating signal, the collected data is transmitted for processing and identifying location of the reflection origin (object causing the reflection). For example, when using common plurality of antenna units for transmission and collection, the reflection level estimator 530 may operate for summing the collected signals in accordance with phase differences as determined in the transmitted signal.

Figure 4A:
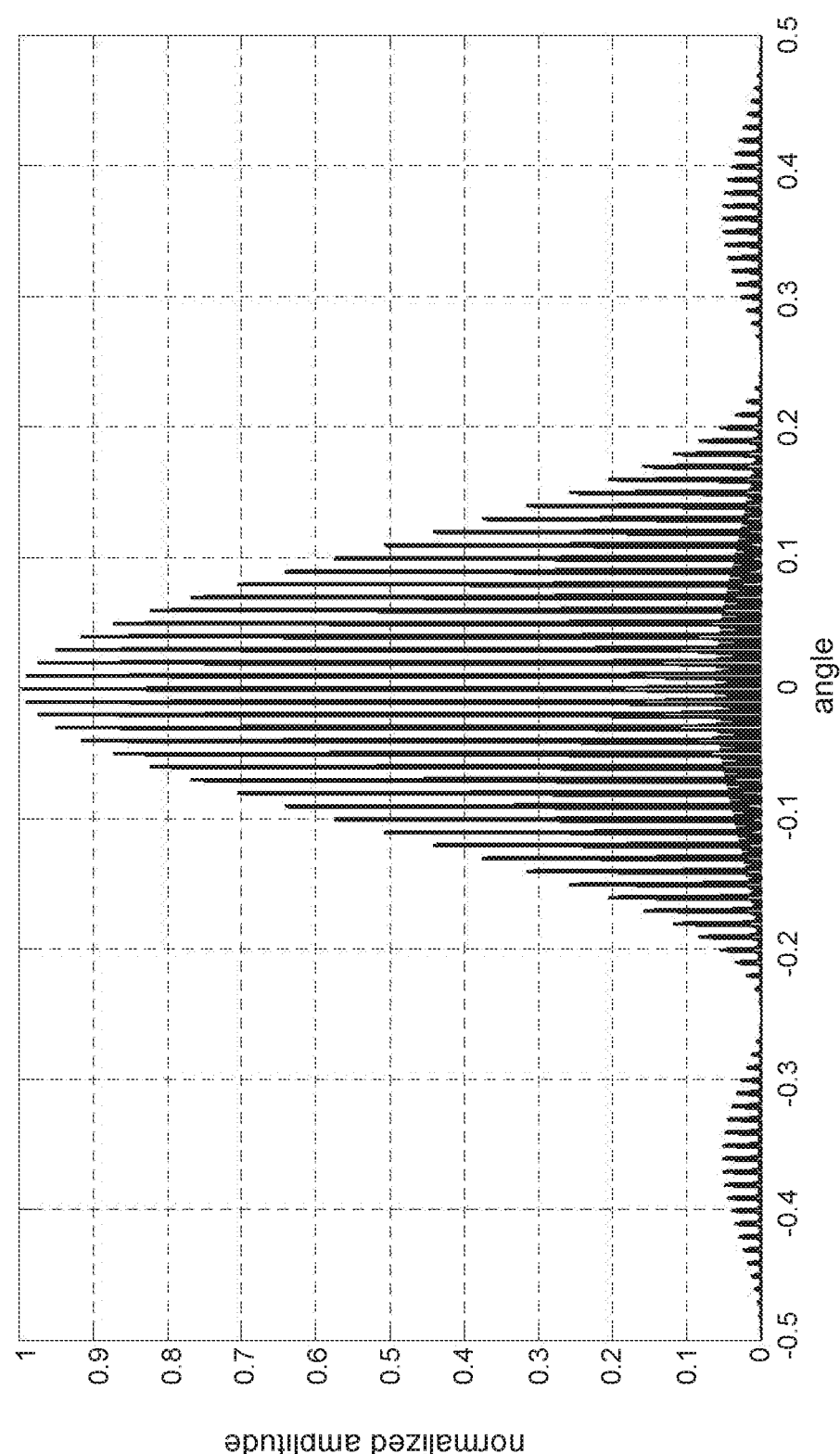
FIGS. 4A to 4E exemplify beam structure (FIGS. 4A and 4B), conventional mono-pulse calibration curve (FIG. 4C) and first and second mono-pulse calibration curves (FIGS. 4D and 4E respectively) according to some embodiments of the present invention.
Figure 4B:
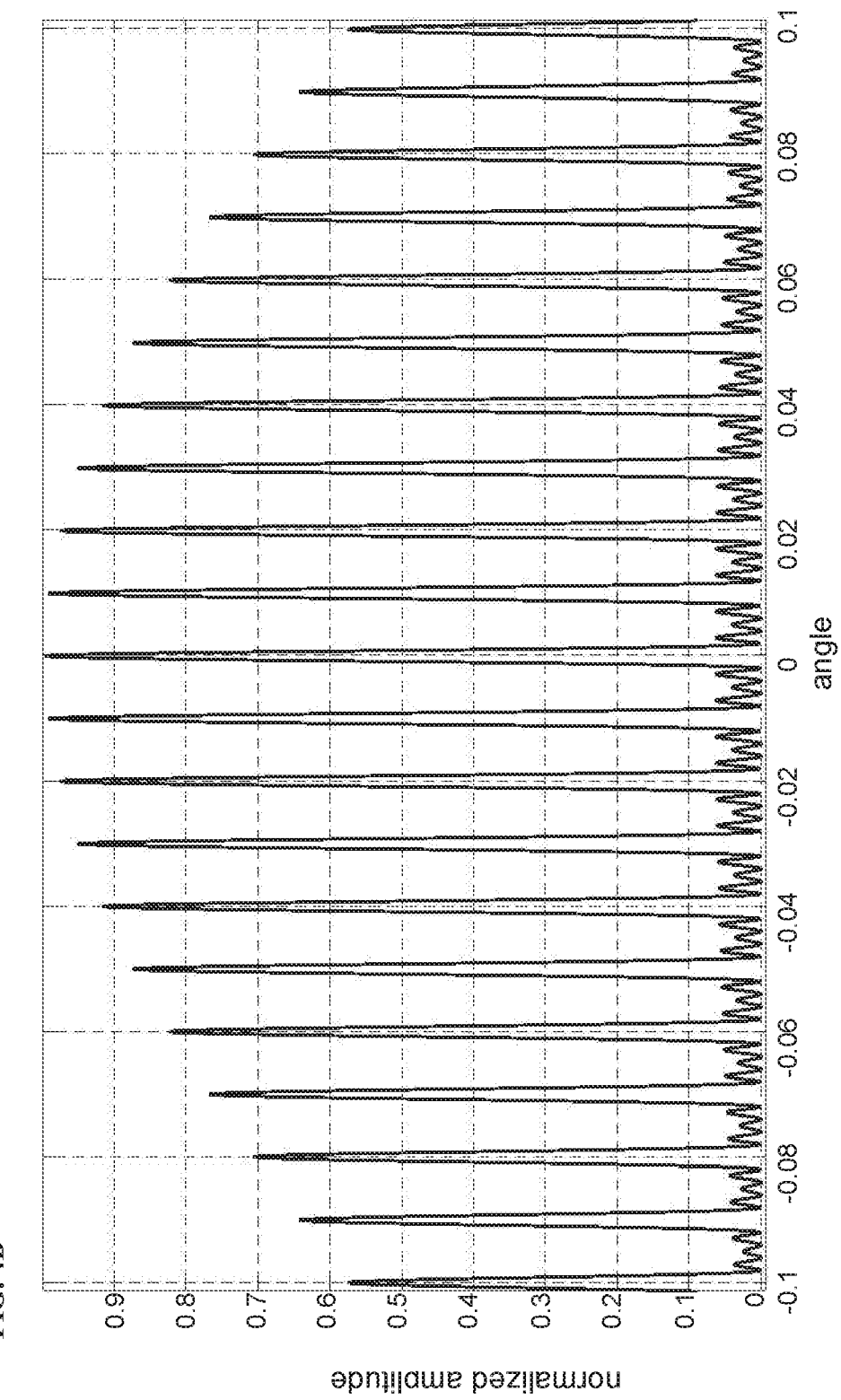

The beam constructor 540 is adapted for determining structure of the transmitted beam and/or receive beams. Generally, the beam constructor 540 is configured to obtain, e.g. from the storage module 505, data on physical arrangement of the plurality of antenna units 50 and data on the interrogating signal transmitted by the plurality of antenna units, and to determine spatial beam structure of the transmitted signal. An exemplary structure of signal transmitted by typical arrangement of antenna units 50 forming a distributed radar system is shown in FIGS. 4A and 4B. As described in more detail further below, typical beam structure of signals transmitted by distributed antenna arrangement (e.g. forming distributed radar system) generally includes a plurality of spatial features/teeth within the beam envelope. The beam constructor 540 is generally adapted to determine data on angular width of the spatial features and angular width of the beam envelope in accordance with spatial arrangement of the antenna units 50 and possible data on signal (e.g. direction) being transmitted. The beam constructor 540 may operate once to determined transmitted beam structure and store data about the beam structure on the storage module 505 for later use. In some other configurations, the beam constructor 540 may be operated to determined data on beam structure periodically in accordance with variation of interrogating signal to be transmitted or its direction.

The first 550 and second 560 mono-pulse processors are each configured for determining direction of one or more reflection origins, being one or more objects in path of the transmitted signal that cause signal positions to be reflected and collected by the collection antenna units. The first mono-pulse processor 550 is adapted for receiving input data on signals collected in response to transmission of an interrogating signal, and to determine first and second receive beams having first angular shift between them. The first mono-pulse processor 550 then operates to determine a relation between amplitude of the first and second beams, thereby determining data on location of the reflection origin within range of the first angular shift. The second mono-pulse processor 560 operates on the same input data on signals collected in response to transmission of an interrogating signal, for determining additional set of first and second receive beams, having second angular shift between them, and to determine a relation between them. According to the present technique, the first and second angular shifts are different, while being within common plane (or along common axis). Generally, the first angular shift is determined in accordance with data on angular width of spatial features (teeth) in the beam structure, and the second angular shift is determined in accordance with angular width of envelope of the beam.

Typically, according to some embodiments of the present technique, the first mono-pulse processor 550, operates to determine first mono-pulse processing using first angular shift, being in the range of angular width of spatial features (teeth) in the beam structure. Using this first mono-pulse processing, the first mono-pulse processor 550 determines data on relative location of the reflection origin with respect to the spatial features of the beam. More specifically, the first mono-pulse processing may determine where, within angular width of the teeth in the beam, the reflection origin is located, while generally the first mono-pulse processor 550 cannot determine which of the teeth in the beam is the relevant teeth. The second mono-pulse processor 560, operates to determine second mono-pulse processing along a common axis, while using a second angular shift in the range of beam envelope. Generally, mono-pulse processing using angular shift in the range of beam envelope may be sufficient for determining angular location of reflection origin. However, when using an interrogating signal transmitted by distributed arrangement of antenna units, i.e. distances between the antenna units are larger (or much larger) than wavelength of transmitted signal. Spatial features, e.g. in form of teeth, in the received beam limit resolution of such conventional mono-pulse processing.

Generally, to determine a receive beam, the mono-pulse processor (either the first mono-pulse processor 550 or the second mono-pulse processor 560) utilizes coherent integration of signal portions of the plurality of receive channels. More specifically, the receive channels are summed between them while selected phase and time shifts applied to different channels in accordance with direction of the receive beam and relative location of the antenna element corresponding with each channel as described in more detail further below.

The object location estimator 570 utilizes the direction data indicative of angular direction of one or more reflection origins, determined by the first and second mono-pulse processors 550 and 560. The object location estimator 570 may further determine time delay between transmission and collection of the reflected signals for determining distance of the reflection origin and may determine Doppler shift of the reflected signals. For example, in some configurations the object location estimator 570 may determine map indicative of relation between Doppler shift and range (time delay) for determining distance and velocity of the reflection origin.

Figure 4C:
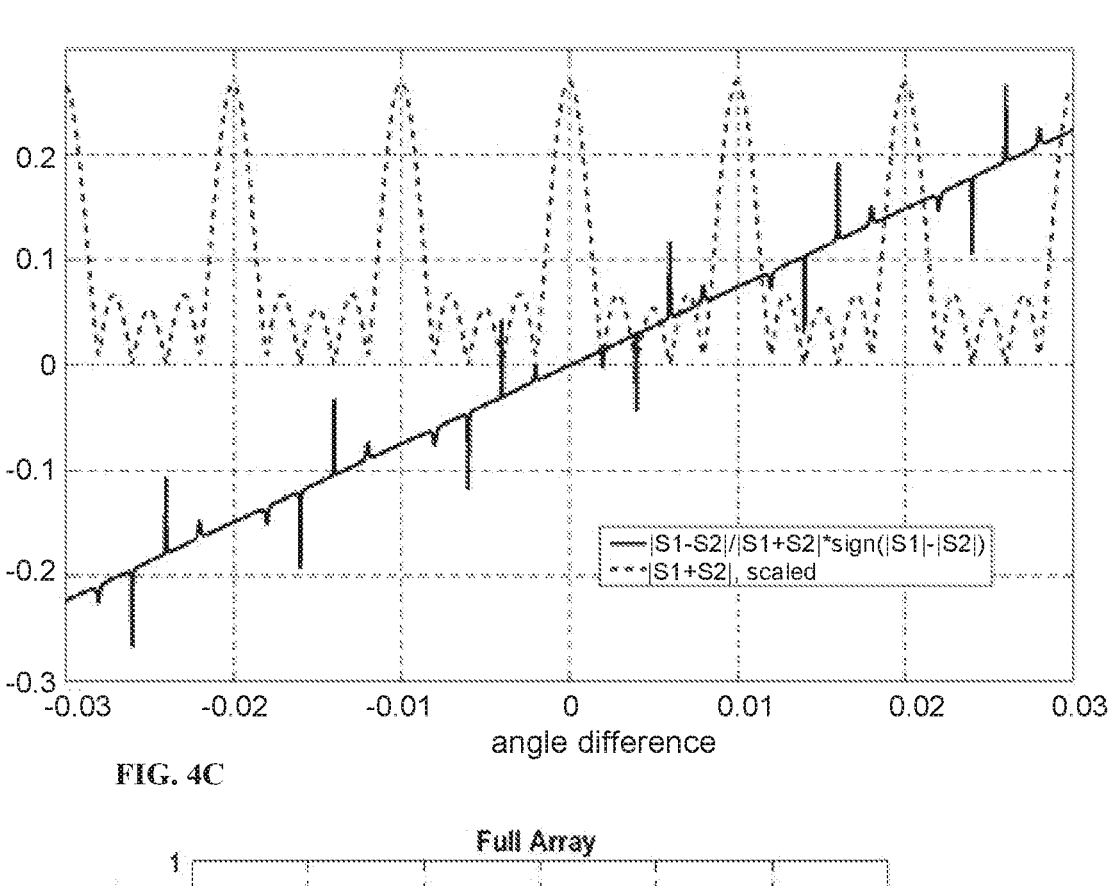
Figure 4D:
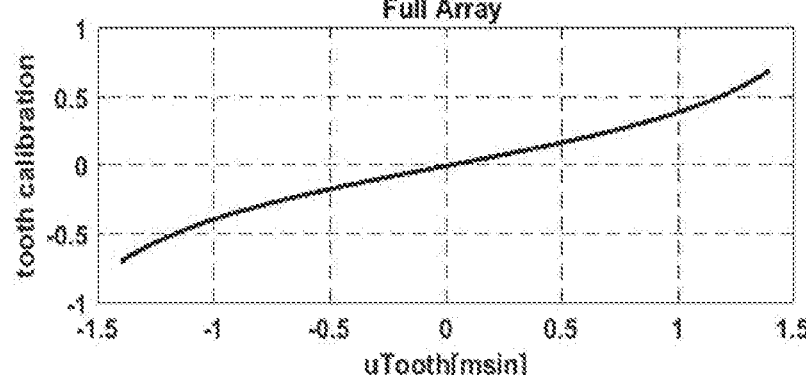

As indicated above, distributed radars utilize a collections of synchronized antenna units, transmitting an interrogation signal coherently, and utilizing coherent collection of reflected signals (by the same arrangement of antenna units or a separate antenna arrangement). The transmission pattern of a signal transmitted by such arrangement of antenna units is typically characterized by many narrow beams forming spatial features (or teeth) within signal envelope. Reference is made to FIGS. 4A to 4E exemplifying structure of a signal transmitted by distributed arrangement of antenna units in FIGS. 4A and 4B, calibration lines for mono-pulse conventional processing technique in FIG. 4C, and calibration lines for the first and second mono-pulse processing according to the present technique in FIGS. 4D and 4E. FIG. 4A exemplifies main lobe of transmission signal having angular width of about 0.4 degrees, FIG. 4B illustrates magnification of central portion of the transmission lobe showing internal structure of the spatial features forming teeth within the signal envelope. This signal structure causes ambiguity in determining location of reflection origin using the conventional techniques. This fact generally renders advantages of distributed radar unusable. FIG. 4C exemplifies variations in mono-pulse calibration curve determined generally in the conventional technique based on transmitted beam as exemplified in FIGS. 4A and 4B. In this example, the calibration curve is determined as absolute value of the difference between the two received beams normalized by absolute value of sum of the two receive beams. As shown, the calibration curve is not fully monotonic and includes peaks associated with the teeth structure of the antenna pattern. The peaks in the calibration curve generate ambiguity in determining location of one or more objects being reflection origins. The peaks in the calibration curve are artifacts caused by regions where the sum signal in weak due to the teeth structure. The inventors of the present technique have found that by isolating regions of the calibration curve indicative of strong signal regions (teeth of the beam structure), the calibration curve is generally monotonic enabling to determine location of the reflection origin.

As indicated above, the present technique utilizes first and second mono-pulse processing stages, using corresponding first and second angular shifts between the receive beams in each mono-pulse processing stage. In this connection, FIG. 4D exemplifies calibration curve of mono-pulse processing using angular shift of the order of width of a single tooth in the signal structure and FIG. 4E exemplifies calibration curve of mono-pulse processing using angular shift of the order of width envelope of the signal. To avoid peaks in the calibration curve, the angular shift between the receive beams is preferably determined in accordance with angular periodicity of the teeth in the antenna pattern. This provides integer number of teeth within the angular shift between the receive beams.

Accordingly, a first mono-pulse processing utilizes first angular shift, generally in the order of angular width of teeth within the beam structure, provides location of the reflection origin within angular range of a tooth of the beam structure. The second mono-pulse processing, utilizing angular shift in the order of angular width of the signal envelope, determines the reflection origin location with respect to the entire beam width, i.e. determined along which of the teeth the reflection origin is located.

Figure 4E:
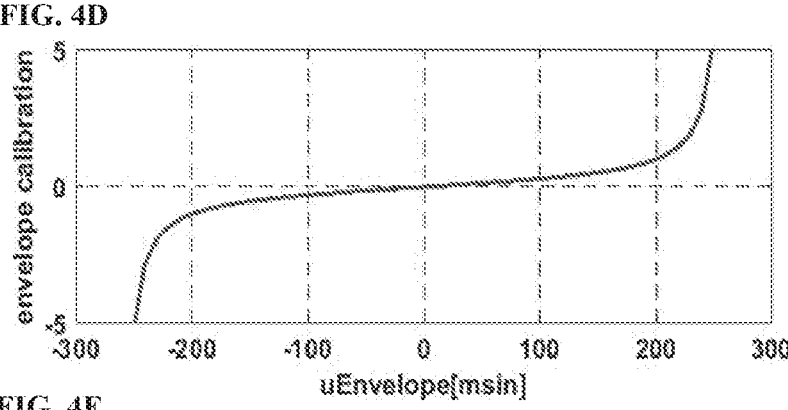

The calibration curves exemplified in FIGS. 4E and 4F illustrate the ability, according to the present technique, to determine the actual tooth that received the signal and the position of the target inside that tooth. In some conditions the present technique may utilize an additional interrogating signal of selected different frequency range. This may be used in noisy environment or weak signal, where signal to noise ratio (SNR) is low. Generally, in such low SNR conditions the use of first and second mono-pulse processing as indicated above may be sufficient to reduce ambiguity in determining the tooth associated with angular location of the reflection origin. To this end, the use of additional interrogating signal having different frequency, provides for varying the span of the teeth within the beam and thus for determining location of the reflection origin.

Figure 5:
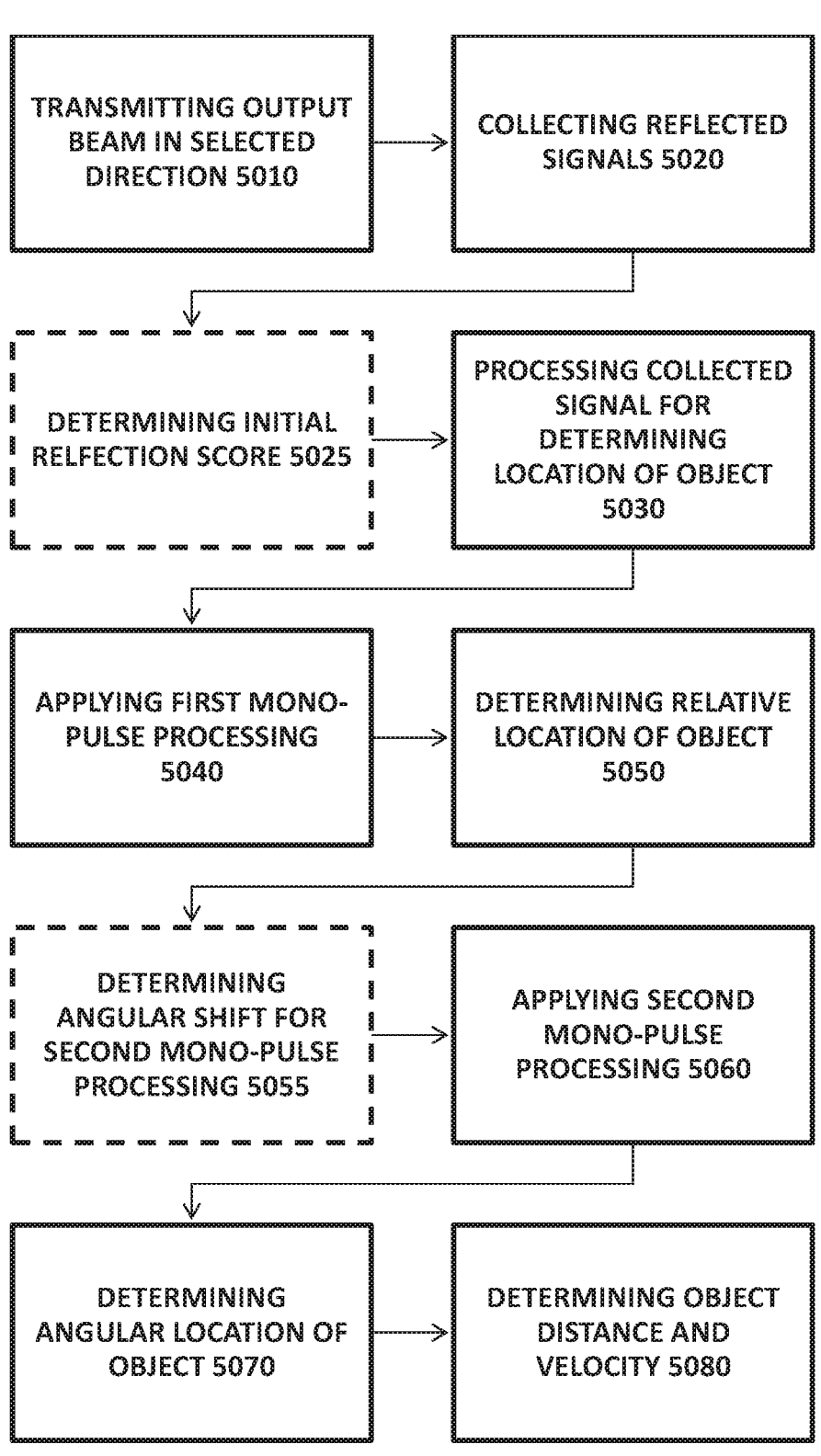
FIG. 5 exemplifying general operation actions according to some embodiments of the present invention.

Reference is made to FIG. 5 exemplifying general operation actions according to some embodiments of the present technique. As shown a distributed radar (antenna) system is operated to transmit an output beam having selected direction 5010. The output beam acts as interrogating signal and has wavefront that is determined by transmitted signal frequency, phase and time relation between antenna elements (beam stirring) and physical arrangement of the antenna units. Generally, for distributed radar system, where the distances between antenna units may be much larger than wavelength of the transmitted signal, the signal has internal teeth structure as exemplified in FIG. 4A. Shortly after transmitting the output signal, the antenna units (or selected collecting antenna arrangement) are operated for collecting and recording signals 5020 in frequency range corresponding to the transmitted signal. In some configurations, the technique may utilize collection in shifted frequency to identify reflected signals that are doppler shifted. The collected/recorded signals generally include a plurality of recorded channels, each associated with one antenna element of the collection arrangement (or plurality of antenna units if common antenna arrangement is used for transmission and collection). The collected signals may be preprocessed for determining a reflection score 5025. For example, the reflection score may be associated with total (integrated) recorded reflections. If the recorded signals exceed a selected threshold for reflection score, it is assumed that an object caused the recorded reflections. If the reflection score is below the selected threshold, no object has been detected, and additional processing may not be needed. The threshold may generally be determined in accordance with level of ambient noise.

Upon determining that one or more objects have reflected the transmitted signal, the technique utilizes processing the recorded signals for determining location of the reflection origin 5030 (object causing the reflection). The processing includes applying a first mono-pulse processing 5040 for determining relative location of the reflection origin 5050 with respect to angular width of a tooth in the beam. And a second mono-pulse processing 5060 for determining location of the reflection origin 5070. As illustrated, the angular shift used of the second mono-pulse processing may be determined 5055 partially in accordance with relative location of the object.

More specifically, in each mono-pulse processing stage, the present technique utilizes the recorded data and determined coherent sums of the recorded channel corresponding to receive beams having selected angular shift between them. For example, a first receive beam is determined to be shifted by 0.001 degrees of the boresight along horizontal (vertical) axis to one direction, and a second receive beam is shifted by 0.001 degrees of the boresight along horizontal (vertical) axis to the other direction (−0.001). A relation between the resulted beams is determined, e.g. by determining difference between the beams normalized by the sum of the beams. The relation between the receive beams indicates location of the reflection origin within the angular span between the beams. as illustrated in FIGS. 4A and 4B, this example providing angular span of 0.002 degrees may only be enough to determine location of the reflection origin within angular width of a tooth in the signal, thereby providing relative location 5050.

The second mono-pulse processing 5060 utilizes angular shift of the order of the beam envelope. For example, in accordance with the beam structure illustrated in FIG. 4A, the second angular shift may be ±0.2 degrees along a selected axis (e.g. horizontal or vertical). Generally, the second angular shift may be determined in accordance with the beam structure to provide integer multiplication of the teeth, i.e. aligning the teeth on each other to avoid ambiguity as illustrated in FIG. 4C. Further, the angular shift may be further adjusted by relative location of the reflection origin as determined in the first mono-pulse processing 5055. As indicated, the second mono-pulse processing includes determining first and second receive beams, having the selected angular shift between them, and determining a corresponding relation between the first and second receive beams. The relation between the signal collected in the receive beams indicates location of the reflection origin 5070 within the angular span between the receive beams.

Generally, as indicated above, the present technique may operate for determining location of the reflection origin in three-dimensional space. Accordingly, the above described technique may be performed along two substantially orthogonal axes, such as along vertical axis and along horizontal axis. This enables to determine angular location of the reflection origin in both axes and pinpoint the object's location.

Further, the present technique may also operate for determining distance of the reflection origin 5080. The distance is typically determined in accordance with time delay between transmission of the interrogating signal and time of collection of the reflected signals.

As indicated above, signal transmission from a distributed antenna arrangement, suitable for use in distributed radar system, has typically teeth-like internal structure. This internal beam structure is caused by interference patterns of the signal portions transmitted from the different antenna units. Generally, the angular width of the teeth in the beam structure, as well as the envelope width are determined by parameters of the antenna units and their arrangement. In this connection, reference is made to FIG. 6 exemplifying operation of the present technique according to some embodiments.

To enable determining accurate location data of one or more reflection origins, initial data on arrangement and transmission parameters of the plurality of antenna units are used 6010. The arrangement data may be stored in dedicated memory/storage module. The Technique utilizes parameters of signal to be transmitted 6020, such parameters may include beam width, direction, focusing level etc. Based on the arrangement of antenna units and beam parameters the technique utilizes processing based on radiation propagation characteristics to determine the beam spatial features 6030. Such spatial features generally include determining envelope width and width of the teeth within the envelope structure. Based on width of the teeth in the beam structure, the technique determined angular shift 6040 corresponding with width of the teeth in the beam structure. This selected angular shift may be predetermined for giver arrangement of antenna units and stored in memory/storage module for use in analysis of reflection signals.

Upon receiving of collected signal data, indicative of reflections collected by the antenna units (or antenna arrangement selected for collection of reflected signals), the technique operates for processing the collected data for determining location of reflection origin(s). As indicated above, the processing may typically utilize first mono-pulse processing 6050 using the so-determined first angular shift. The first mono-pulse processing typically includes determining first and second receive beams shifted by the first angular shift and determining a relation between the signals associated with the first and second receive beams. This first mono-pulse processing provides data on relative location of the reflection origin 6060. This relative location data generally indicates location of the reflection origin within span of the first angular shift, while not necessarily indicating the relevant teeth within the beam structure.

The angular shift used for the second mono-pulse processing is determined 6070 in accordance with width of the signal envelope, while generally selected to be a multiple of angular frequency of the teeth within the beam structure. In some configurations, the second angular width may be further corrected by shift determined by the relative location of the reflection origin as determined in the first mono-pulse processing. The processing then proceeds with the second mono-pulse processing 6080 associated with determining first and second receive beams shifted by the second angular shift between them. A relation between the first and second receive beams is indicative of angular location of the reflection origin within the span of the second angular width. Generally, as exemplified in FIG. 4C, the reflection origin location may be determined as the teeth in which the reflection is detected.

The angular location of the reflection origin can thus be determined 6090 based on location as determined in the second mono-pulse processing, corrected by the relative location as determined by the first mono-pulse processing. For example, the second mono-pulse processing provides data on which of the teeth within the signal structure is associated with the reflection, and the first mono-pulse processing provides fine-tuning within the width of the corresponding tooth, indicating angular location of the reflection origin. Generally, in addition to determining direction of objects detected by the radar system, the radar system may further utilize data on delay of received signal with respect to transmitted signal, and on doppler shift in radiation frequency for determining distance and/or closing speed of the object 6095.

Accordingly, the technique of the present invention provides distributed radar system, utilizing a plurality of antenna units (e.g. digital phased array radars/antennas) deployed in a regular structure and synchronized to very high accuracy (e.g. tenth to hundredth of radar frequency cycle). The distributed radar system can be operated to scan a predefined area of interest until a target is detected. Once a target is detected, e.g. by determining reflection score exceeding preselected threshold, the received signal is processed by two sets of mono-pulse beams associated with two different angular shift/deflections between the receive beams. The set with the smaller angular deflection is generally used to measure the target position inside the sharp tooth structure of the beam and the second set with a larger angular deflection (typically an integer multiple of the tooth steps) is used to select a tooth. The technique enables removing ambiguity in determining location of reflection origin, and improved accuracy of detection. The present technique thus enables to overcome ambiguity associated with complex structure of signals transmitted by distributed radar systems.

The invention claimed is:
1. A distributed antenna system, comprising:
a plurality of antenna units arranged in a predetermined spaced apart arrangement in a selected region and configured to collectively transmit an output radiation signal and receive collected radiation signals, the output radiation signal having a known beam structure including a plurality of spatial features within a beam envelope;
a control system connected to the plurality of antenna units and configured for:

transmitting operational instructions to said plurality of antenna units for transmitting the output radiation signals;

receiving data indicative of collected radiation signals, collected in response to a reflection of the output radiation signal, and processing the data indicative of the collected radiation signals and determining at least data on an angular location of one or more objects associated with said collected radiation signals;

wherein, distances between the plurality of antenna units are larger than a wavelength of the output radiation signal transmitted or received by the antenna system; and wherein, said processing comprising, for at least one axis: applying a first mono-pulse beam processing characterized by a first angular shift, and determining relative location of said one or more objects with respect to spatial features in the received beam, and applying a second mono-pulse beam processing characterized by a second angular shift different from the first angular shift for determining location of said one or more objects with respect to said arrangement of the plurality of antenna units;

wherein the first angular shift is determined in accordance with an angular width of the spatial features in the beam structure, wherein the second angular shift is determined based on an angular width of the beam envelope, being an integer multiple of an angular distance between the spatial features in the beam structure, and wherein the first angular shift is smaller with respect to the second angular shift.

2. The distributed antenna system of claim 1, wherein said plurality of antenna units are operated for transmitting said output radiation signal, and for receiving electromagnetic signals associated with reflection of said output radiation signal.

3. The distributed antenna system of claim 1, further comprising a separate receiving antenna arrangement comprises antenna units adapted for collecting electromagnetic signals associated with reflection of said output radiation signal.

4. The distributed antenna system of claim 1, wherein said plurality of antenna units comprise phase array antenna units.

5. The distributed antenna system of claim 1, wherein said second angular shift is further determined in accordance with said relative location of said one or more objects.

6. The distributed antenna system of claim 1, wherein said plurality of antenna units are arranged facing substantially parallel direction.

7. The distributed antenna system of claim 1, wherein said plurality of antenna units are arranged in conformity with certain environment pattern, phase and time delay of signal components adjusted between the plurality of antenna units for transmitting desired output radiation signal.

8. The distributed antenna system of claim 1, wherein said plurality of antenna units are configured for synchronous transmission of the output radiation signal.

9. The distributed antenna system of claim 1, wherein said plurality of antenna units comprise antenna units mounts on one or more moveable platforms.

10. The distributed antenna system of claim 1, wherein said processing comprises:

applying a first mono-pulse beam processing characterized by a first angular shift along first selected axis, and determining relative location of said one or more objects with respect to selected received beam;

applying a second mono-pulse beam processing characterized by a second angular shift along said first selected axis and determining location of said one or more objects with envelope structure of received beam along said first selected axis;

repeating said first and second mono-pulse processing utilizing corresponding first and second angular shifts along a second axis, being non-parallel with said first axis, and determining location of said one or more objects with envelope structure of received beam along the second selected axis.

11. The distributed antenna system of claim 1, wherein said processing further comprises determining distance of said one or more objects in accordance with time delay between time of transmission of signal and time of collecting of collected radiation signals portions.

12. The distributed antenna system of claim 1, wherein said processing further comprises determining closing velocity of said one or more objects in accordance with doppler shift of collected radiation signals.

13. The distributed antenna system of claim 1, wherein each of said first and second mono-pulse processing comprise determining first and second receive beams shifted between them by a selected angular shift, and determining a predetermined relation between said first and second receive beams, said predetermined relation being indicative of angular location of said one or more objects within span of said angular shift.

14. A control unit for use in distributed radar system having a plurality of antenna units arranged in a predetermined spaced apart arrangement in a selected region and configured to collectively transmit an output radiation signal and receive collected radiation signals, the output radiation signal having a known beam structure including a plurality of spatial features within a beam envelope, with distances between the plurality of antenna units that are larger than a wavelength of the output radiation signal transmitted or received by the radar system, the control unit comprising:

a communication module configured for communicating with a plurality of antenna units for receiving input data indicative of collected radiation signal portions from said plurality of antenna units, said radiation signal portions being associated with reflected signal portions from one or more objects;

at least one processor, said processor comprises a localization module adapted for processing said input data and determining location of one of more objects;

said processing comprises for at least one axis: applying a first mono-pulse beam processing characterized by a first angular shift, and determining relative location of said one or more objects with respect to spatial features in a received beam by said plurality of antenna units, and applying a second mono-pulse beam processing characterized by a second angular shift different from the first angular shift for determining angular location of said one or more objects with respect to said arrangement of plurality of antenna units;

wherein the first angular shift is determined in accordance with an angular width of the spatial features in the beam structure, wherein the second angular shift is determined based on an angular width of the beam envelope, being an integer multiple of an angular distance between the spatial features in the beam structure, and wherein the first angular shift is smaller with respect to the second angular shift.

15. The control unit of claim 14, wherein said control unit comprises storage utility and at least one processor, said storage utility comprises array location data indicative of locations of said plurality of antenna units, said at least one processor comprises beam calculator adapted for using data of location of said plurality of antenna units and data on beam to be transmitted by said plurality of antenna units for determining beam features data indicative of toothlike features in the transmitted or received beam.

16. A software product embedded in a non-transitory computer readable medium and comprising computer instructions that when executed by one or more computer processor cause the processors to:

acquire data indicative of a predetermined spaced apparat spatial arrangement of a distributed antenna system comprising a plurality of antenna units in a selected region and of a known beam structure of an output radiation signal collectively transmitted by the plurality of antenna units, of the known beam structure including a plurality of spatial features within a beam envelope, wherein distances between the plurality of antenna units are larger than a wavelength of the output radiation signal transmitted or received by the distributed antenna system;

receive input data collected from a plurality of antenna units and indicative of collected electromagnetic radiation signals associated with reflection of the transmitted output radiation signal from one or more objects;

processing the input data for determining location of said one or more objects with respect to said arrangement of a plurality of antenna units, said processing comprises:

applying a first mono-pulse beam processing characterized by a first angular shift, and determining a relative location of said one or more objects with respect to spatial features in a received beam, and applying a second mono-pulse beam processing characterized by a second angular shift different from the first angular shift for determining location of said one or more objects with respect to said arrangement of plurality of antenna units;

wherein the first angular shift is determined in accordance with an angular width of the spatial features in the beam structure, wherein the second angular shift is determined based on an angular width of the beam envelope, being an integer multiple of an angular distance between the spatial features in the beam structure, and wherein the first angular shift is smaller with respect to the second angular shift.

\* \* \* \* \*